US008994346B2

(12) United States Patent
Rahardjo et al.

(10) Patent No.: US 8,994,346 B2
(45) Date of Patent: Mar. 31, 2015

(54) SYSTEMS AND METHODS FOR DYNAMIC MANAGEMENT OF SWITCHING FREQUENCY FOR VOLTAGE REGULATION

(75) Inventors: Johan Rahardjo, Austin, TX (US); Abey K. Mathew, Georgetown, TX (US); John J. Breen, Harker Heights, TX (US)

(73) Assignee: Dell Products LP, Round Rock, TX (US)

( * ) Notice: Subject to any disclaimer, the term of this patent is extended or adjusted under 35 U.S.C. 154(b) by 419 days.

(21) Appl. No.: 13/370,017

(22) Filed: Feb. 9, 2012

(65) Prior Publication Data

US 2013/0207630 A1 Aug. 15, 2013

(51) Int. Cl.
*G05F 1/577* (2006.01)
*G06F 1/32* (2006.01)
*H02M 3/156* (2006.01)
*H02M 1/00* (2006.01)

(52) U.S. Cl.
CPC ............... *H02M 3/156* (2013.01); *G06F 1/324* (2013.01); *G06F 1/3296* (2013.01); *H02M 2001/0009* (2013.01); *H02M 2001/0019* (2013.01); *Y02B 60/1217* (2013.01); *Y02B 60/1285* (2013.01)
USPC .......................................... 323/267; 323/272

(58) Field of Classification Search
USPC .................... 323/267, 272, 282, 283
See application file for complete search history.

(56) References Cited

U.S. PATENT DOCUMENTS

| 4,630,187 | A | * | 12/1986 | Henze ............................. 363/41 |
| 5,627,412 | A | | 5/1997 | Beard |
| 6,188,206 | B1 | | 2/2001 | Nguyen et al. |
| 6,366,070 | B1 | | 4/2002 | Cooke et al. |
| 6,425,086 | B1 | | 7/2002 | Clark et al. |
| 6,639,391 | B2 | | 10/2003 | Huang et al. |
| 6,678,831 | B1 | | 1/2004 | Mustafa et al. |
| 6,940,328 | B2 | * | 9/2005 | Lin ................................ 327/175 |
| 7,240,223 | B2 | | 7/2007 | De Cesare et al. |
| 7,260,731 | B1 | | 8/2007 | Read et al. |
| 7,592,789 | B2 | * | 9/2009 | Jain ............................... 323/276 |
| 7,791,324 | B2 | * | 9/2010 | Mehas et al. .................. 323/283 |
| 8,072,204 | B1 | * | 12/2011 | Heineman et al. ............ 323/284 |
| 8,281,163 | B2 | * | 10/2012 | Lambert et al. ............... 713/300 |
| 8,487,477 | B2 | * | 7/2013 | Heineman ....................... 307/82 |
| 8,575,909 | B2 | * | 11/2013 | Tuten ............................ 323/282 |
| 2009/0119519 | A1 | | 5/2009 | McDonald et al. |
| 2010/0277151 | A1 | | 11/2010 | Tsai et al. |
| 2011/0254526 | A1 | | 10/2011 | Luo et al. |

OTHER PUBLICATIONS

PitelSpot, "DCR Current Sensing Explained", Printed From Internet on Nov. 30, 2011, 4 pgs.
Volterra, "Investigation of DCR Current Sensing in Multiphase Voltage Regulators", Printed From Internet on Oct. 12, 2011, 17 pgs.

* cited by examiner

*Primary Examiner* — Rajnikant Patel (74) *Attorney, Agent, or Firm* — Egan, Peterman & Enders LLP (57) ABSTRACT

Systems and methods are provided that may be implemented to dynamically manage voltage regulator switching frequency. In one embodiment, the disclosed systems and methods may be implemented to dynamically find the optimal voltage regulator switching frequency based on the load current ($I_{OUT}$) and efficiency in a switching voltage regulator device (VR), such as a voltage regulator down device (VRD) that is embedded on a system board of an information handling system.

26 Claims, 6 Drawing Sheets

SYSTEMS AND METHODS FOR DYNAMIC MANAGEMENT OF SWITCHING FREQUENCY FOR VOLTAGE REGULATION

FIELD OF THE INVENTION

This invention relates generally to voltage regulators, and more particularly to voltage regulator switching frequency.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Traditionally, DC/DC voltage regulation down devices (VRDs) have had fixed designs with operating efficiency that is maximized for higher current loads to ensure proper thermal management. Such approaches tend to compromise operating efficiency when operating in lighter current load ranges. Various techniques have been proposed to improve VRD efficiencies in the lighter load ranges, including phase-shedding, gate voltage adjustment, diode emulation, frequency reduction, baby buck, etc. Use of diode emulation at light load conditions has demonstrated minor improvement to VRD operating efficiency, but this minor efficiency improvement is accompanied by complications and required compromises such as an increased bill of materials (BOM) cost and a negative impact on performance. Moreover, use of diode emulation makes accurate detection of zero-crossing current difficult when employing common techniques such as use of inductor direct current resistance (DCR) circuitry or monitoring the phase node to detect zero crossing. As the actual signal is embedded within the noise, these traditional methods are not accurate. Additionally, during diode emulation mode, the power stage transfer function is different than when operating a VRD in continuous conduction mode (CCM) such that the control loop bandwidth in diode emulation mode is reduced as compared to the CCM mode. This in turn may require additional circuits to make sure the VRD seamlessly transitions between these two operating behaviors, especially during transients.

It has also been common to reduce the switching frequency at light current loads in an effort to increase the VR efficiency by lowering the switching losses in the switching FETs. In this regard, switching frequency may be greatly reduced as the load drops, e.g., from about 300 Khz to about 2 kz as an example. Most VRD controllers and power switches have a minimum on-time requirement, however, reducing the switching frequency acts to increase the off time of these components. This results in the need for an increased number of output capacitors to keep the output ripple within specification. Another drawback of reducing the switching frequency during low current loads is a negative impact on the transient response. This also results in a need for additional capacitors, and additional circuits may be required for operation during occurrence of transients.

SUMMARY OF THE INVENTION

Disclosed herein are systems and methods that may be implemented to dynamically manage voltage regulator switching frequency. In one embodiment, the disclosed systems and methods may be implemented to dynamically find the optimal voltage regulator switching frequency based on the load current ($I_{OUT}$) and efficiency in a switching voltage regulator device (VR), such as a voltage regulator down device (VRD) that is embedded on a system board of an information handling system. In one embodiment, the switching frequency of a VR may be incrementally increased in real time as the load current ($I_{OUT}$) of the VR decreases, and the switching frequency of the VR may be incrementally decreased in real time as the load current ($I_{OUT}$) of the VR increases. Such real time increases and decreases in the switching frequency may be iteratively controlled between a large number of switching frequency values (e.g., between three or more different switching frequency values) based on corresponding changes in real time measured VR efficiency that result from the changes made to the switching frequency in order to continuously optimize (e.g., maximize) the measured VR efficiency as the VR load current varies. In one embodiment, the disclosed system and methods may be implemented to control incremental switching frequency changes in a manner that is not open loop, and since the switching frequency changes are made as a function of both the load current ($I_{OUT}$) and VR efficiency, in a manner that is design independent.

In the practice of one embodiment of the disclosed systems and methods, a sweep of switching frequencies may be provided across which a VR may operate, and in-situ real time efficiency characterization may be employed during run-time to dynamically adjust switching frequency in a closed loop algorithm. Moreover, frequency may be adjusted continuously to have maximum efficiency throughout the current load range of a VR, and frequency changes may be based on instantaneous efficiency of a VR system during operation and continuously optimized as component characteristic changes over time (i.e., and not limited to predetermined frequencies that are set at design time).

In one exemplary embodiment, the load current ($I_{OUT}$) of a VR may be monitored in real time as it changes (e.g., decreases), and the switching frequency of the VR may be increased when the monitored load current becomes less than or equal to one or more threshold value/s. Such a threshold value may correspond to a pre-selected default minimum threshold current value and/or a previously calculated and stored value of average peak to peak ripple current ($I_{AVG}$) for an inductor of the VR. In such an embodiment, when the VR load current is found to be less or equal to the threshold value/s, then the switching frequency of the VR may be incrementally increased. The resulting new VR efficiency obtained after increasing the VR switching frequency is then calculated and compared to the previous efficiency of the VR at the lower switching frequency prior to the switching frequency increase. The new higher switching frequency may be retained if the new VR efficiency is higher than the previous VR efficiency, or may be incrementally reduced (e.g., reset to the previous lower switching frequency or to another lower frequency value) if the new VR efficiency is found to be lower than or equal to the previous VR efficiency. This process may be iteratively repeated during operation of the VR as the load current varies and remains below or equal to the load current threshold value/s. Each iteration, a new real time average inductor current ($I_{AVG}$) may be calculated based on each new switching frequency setting, stored, and the steps are repeated. In one exemplary embodiment, once the load current increases above the designated threshold value/s, the switching frequency may be reset to a pre-defined default value, and the methodology repeated.

Using the disclosed systems and methods, the efficiency of a VR may be dynamically optimized for a certain given real time switching frequency, and in a manner that is design specific and that takes into account losses of different components in the circuit at the real time frequency operating point of the VR. The disclosed systems and methods do not always attempt to reduce the switching frequency at light current loads to increase the VR efficiency, as it has been found that reducing the switching frequency does not always necessarily lower the switching losses, e.g., which traditionally has primarily occurred in the switching field-effect transistors (FETs) of a VR. The disclosed systems and methods may be implemented in one embodiment to take advantage of current FET technology that exhibits greatly reduced switching & conducting losses under conditions where a decrease in switching frequency will not have a major impact on VR efficiency. The disclosed systems and methods may be implemented in another embodiment to outperform diode emulation (DE) techniques, while providing greater power saving and ease of implementation. In this regard, issues typically associated with diode emulation may be substantially avoided, e.g., such as transient performance zero cross detection of inductor current. The disclosed systems and methods may be implemented, for example, to optimize VR efficiency in situations where power density is increasing. Particular applications include, but are not limited to, servers, notebooks, storage, workstations etc.

In one respect, disclosed herein is an information handling system, including: a system load; and DC/DC voltage regulation circuitry. The DC/DC voltage regulation circuitry may include: a power processing circuit including a current path coupled to supply current of regulated output DC voltage across to power the system load, the power processing circuit including one or more drive transistors and the current path of the power processing circuit including at least one inductor for providing current to the system load of the information handling system; and power monitoring controller circuitry coupled to the power processing circuitry, the power monitoring controller circuitry including at least one processing device programmed to regulate power supplied by the DC/DC voltage regulation circuitry across the current path to the system load of the information handling system by switching the one or more drive transistors alternately between ON and OFF states at two or more different switching frequencies. The at least one processing device of the power monitoring controller circuitry may be further programmed to: determine a real time current load ($I_{OUT}$) supplied by the DC/DC voltage regulation circuitry across the current path to the system load of the information handling system at a first one of the two or more different switching frequencies; and incrementally increase the switching frequency of the one or more drive transistors of the power processing circuit to a second one of the two or more different switching frequencies if and only if the determined real time current load ($I_{OUT}$) is less than or equal to at least one of a selected threshold default minimum $I_{OUT}$ value, a value of average peak to peak ripple current ($I_{AVG}$) for the at least one inductor at the first one of the two or more different switching frequencies, or a combination thereof.

In another respect, disclosed herein is an information handling system, including: a system load; and DC/DC voltage regulation circuitry. The DC/DC voltage regulation circuitry may include: a power processing circuit including a current path coupled to supply current of regulated output DC voltage to power the system load, the power processing circuit including one or more drive transistors for providing current across the current path to the system load of the information handling system; and power monitoring controller circuitry coupled to the power processing circuitry, the power monitoring controller circuitry including at least one processing device programmed to regulate power supplied by the DC/DC voltage regulation circuitry across the current path to the system load of the information handling system by switching the one or more drive transistors alternately between ON and OFF states at two or more different switching frequencies. The at least one processing device of the power monitoring controller circuitry may be further programmed to: a) determine a real time operating efficiency value of the power processing circuit corresponding to each of the two or more different switching frequencies, each of the real time operating efficiency values being determined while the one or more drive transistors are switched alternately between ON and OFF states at each of the two or more different switching frequencies; b) vary the value of the switching frequency of the one or more drive transistors of the power processing circuit based on a comparison of the determined two or more real time operating efficiency values of the power processing circuit; and c) iteratively repeat the steps a) through b) for the duration of time that the DC/DC voltage regulation circuitry is supplying power to the system load of the information handling system.

In another respect, disclosed herein is a method for regulating voltage in an information handling system, including: providing DC/DC voltage regulation circuitry coupled by a current path to supply power to a system load of the information handling system, the DC/DC voltage regulation circuitry including a power processing circuit including one or more drive transistors, the current path of the power processing circuit including at least one inductor for providing current to the system load of the information handling system; regulating power supplied by the DC/DC voltage regulation circuitry across the current path to the system load of the information handling system by switching the one or more drive transistors alternately between ON and OFF states at two or more different switching frequencies; determining a real time current load ($I_{OUT}$) supplied by the DC/DC voltage regulation circuitry across the current path to the system load of the information handling system at a first one of the two or more different switching frequencies; and incrementally increasing the switching frequency of the one or more drive transistors of the power processing circuit to a second one of the two or more different switching frequencies if and only if the determined real time current load ($I_{OUT}$) is less than or equal to at least one of a selected threshold default minimum $I_{OUT}$ value, a value of average peak to peak ripple current ($I_{AVG}$) for the at least one inductor at the first one of the two or more different switching frequencies, or a combination thereof.

In another respect, disclosed herein is a method for regulating voltage in an information handling system, including: a) providing DC/DC voltage regulation circuitry coupled by a current path to supply power to a system load of the information handling system, the DC/DC voltage regulation circuitry including a power processing circuit including one or more drive transistors; b) regulating power supplied by the DC/DC voltage regulation circuitry across the current path to the system load of the information handling system by switching the one or more drive transistors alternately between ON and OFF states at two or more different switching frequencies; c) determining a real time operating efficiency value of the power processing circuit corresponding to each of the two or more different switching frequencies, each of the real time operating efficiency values being determined while the one or more drive transistors are switched alternately between ON and OFF states at each of the two or more different switching frequencies; d) varying the value of the switching frequency of the one or more drive transistors of the power processing circuit based on a comparison of the determined two or more real time operating efficiency values of the power processing circuit; and e) iteratively repeating the steps c) through d) for the duration of time that the DC/DC voltage regulation circuitry is supplying power to the system load of the information handling system.

DESCRIPTION OF ILLUSTRATIVE EMBODIMENTS

Figure 1:
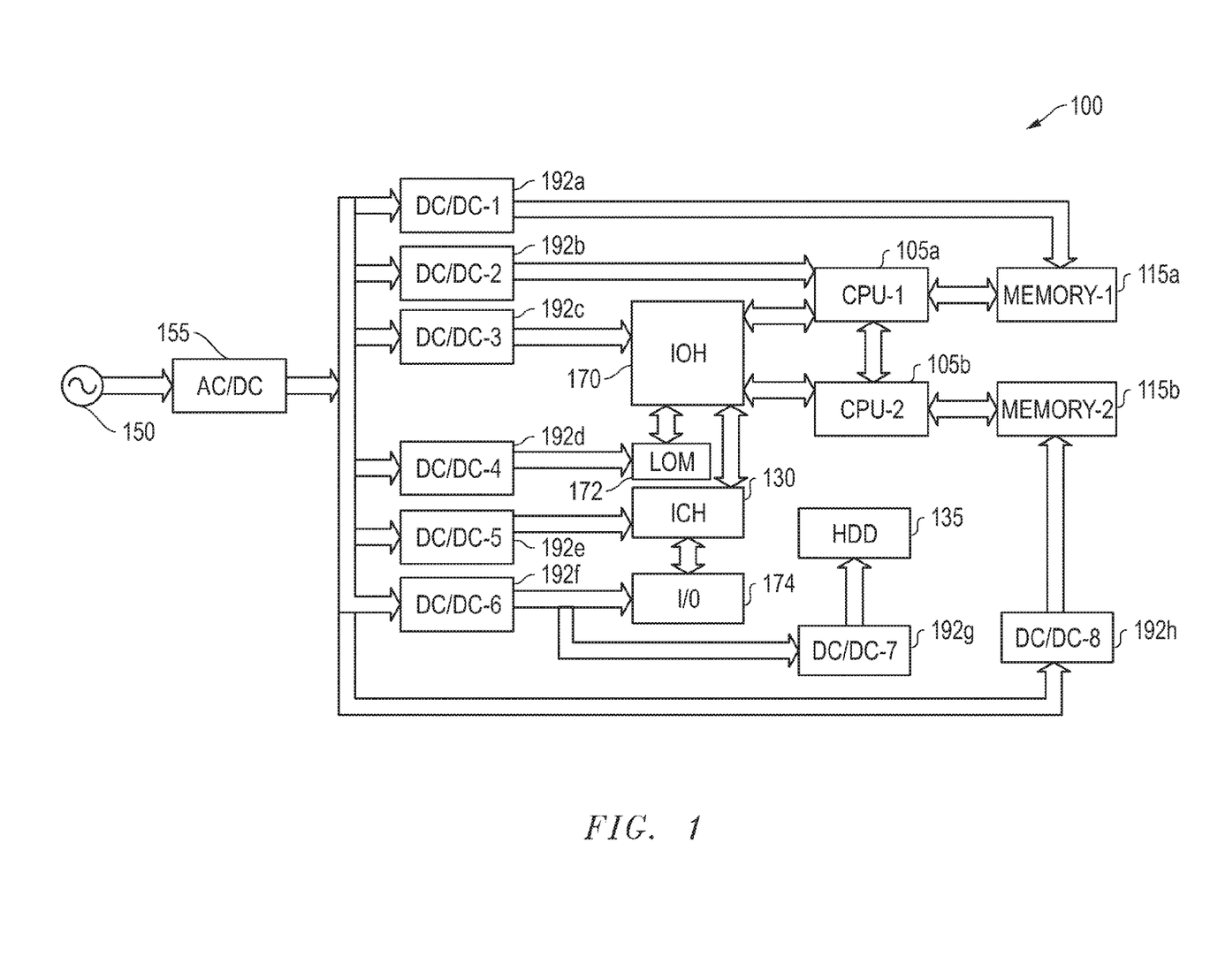
FIG. 1 is a simplified block diagram of an information handling system configured according to one exemplary embodiment of the disclosed systems and methods.

FIG. 1 is a block diagram of an information handling system 100 as it may be configured in a server configuration with digital power controller according to one exemplary embodiment of the disclosed systems and methods. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

As shown in FIG. 1, information handling system 100 of this exemplary embodiment includes central processor units (CPUs) 105a and 105b, each of which may be an Intel Pentium series processor, an Advanced Micro Devices (AMD) processor or one of many other processors currently available. Each of CPUs 105a and 105b are coupled through an input/output hub (IOH) 170 to a local area network on motherboard (LOM) 172, and Intel controlled hub (ICH) chip 130 which is provided to facilitate input/output functions for the information handling system, and which itself is coupled to input/output 174. System memory components 115a and 115b are coupled as shown to respective CPUs 105a and 105b. As shown, media drives in the form of a hard disk media drive (HDD) 135 or other suitable form of media drive may also be provided for permanent storage of the information handling system.

In this particular embodiment, information handling system 100 is coupled to a source of AC power, namely AC mains 150. An AC/DC conversion circuitry (power supply) 155 is coupled to AC mains 150 to convert AC Power from the line to regulated DC voltage and feeds it to the input of multiple DC/DC voltage regulation circuitries 192a-192h (which are exemplary in number and may be greater or fewer in number). Multiple DC/DC voltage regulation circuitries 192a-192h provide particular components of information handling system 100 (i.e., taken together as a system load) with a regulated DC power source as shown. Because power drawn by the various components of information handling system may vary over time, the combined system load and operating conditions of each of DC/DC voltage regulation circuitries 192a-192h may also vary with time. Further information on information handling systems and DC/DC voltage regulation circuitries such as illustrated in FIG. 1 may be found in U.S. patent application Ser. No. 12/387,188, which is incorporated herein by reference in its entirety.

It will be understood that FIG. 1 is exemplary only, and that the disclosed systems and methods may be implemented to power one or more system load components of any other configuration of information handling system. Further, DC/DC voltage regulation circuitries 192a-192h may be implemented, for example, as part of a voltage regulation down device (VRD) or voltage regulation module (VRM) that receives DC power from an AC to DC power supply unit (PSU) configuration. Alternatively, one or more components of DC/DC voltage regulation circuitries 192a-192h may be integrated as part of an AC/DC PSU. In another exemplary embodiment, it is also possible that the disclosed systems and methods may be alternatively implemented with a single DC/DC voltage regulation circuitry component 192, rather than the illustrated multiple DC/DC voltage regulation circuitries 192a-192h.

Figure 2:
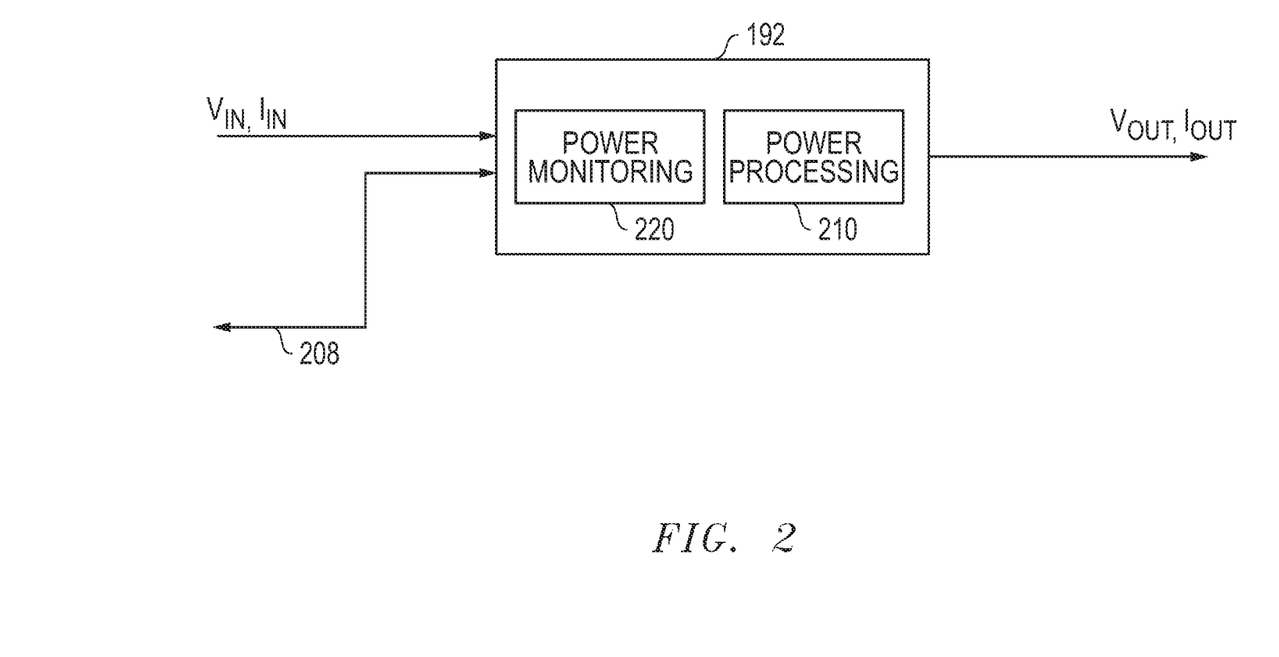
FIG. 2 is a simplified block diagram of DC/DC voltage regulation circuitry configured according to one exemplary embodiment of the disclosed systems and methods.

FIG. 2 shows DC/DC voltage regulation circuitry 192 as it may be implemented for one or more of individual voltage regulation circuitries 192a-192h of FIG. 1 according to one exemplary embodiment of the disclosed systems and methods. In this exemplary embodiment, DC/DC voltage regulation circuitry 192 includes voltage regulation circuitry (main VR) that is coupled to receive input DC current and voltage ($V_{IN}$) (e.g., 12 volts DC input from AC/DC conversion circuitry 155), and is coupled to provide a regulated output DC voltage ($V_{OUT}$) and current ($I_{OUT}$) for powering system load components (e.g., 1.2 volts DC to components of information handling system 100 of FIG. 1). As shown, DC/DC voltage regulation circuitry 192 includes power processing circuit 210 that is controlled to produce current of regulated output DC voltage $V_{OUT}$. In this regard, power processing circuit 210 of DC/DC voltage regulation circuitry 192 may include, for example, two drive transistors (e.g., metal oxide field effect transistors "MOSFETs") that are switched alternately between ON and OFF states at a given duty cycle ("D") using a drive voltage applied to respective gates of the drive transistors to control $V_{OUT}$. In this regard, the value of duty cycle (D) may be determined by power monitoring controller circuitry 220 (described below) and defines the relative percentage of time a main transistor Q2 of FIG. 3 is turned on (e.g., main transistor Q2 and other transistor Q1 of FIG. 3 may be switched alternately so that only one of Q1 and Q2 are on at a given time).

In the illustrated embodiment of FIG. 2, DC/DC voltage regulation circuitry 192 may further include power monitoring controller circuitry 220 that measures real time (i.e., instantaneous) operating parameters such as $V_{IN}$, $V_{OUT}$, $I_{IN}$, $I_{OUT}$, etc. and/or calculates real time operating parameters such as operating efficiency and duty cycle ("D") of DC/DC voltage regulation circuitry 192, etc. Tasks of power monitoring controller circuitry 220 may be performed by any circuitry that is suitable for making such measurements and/or calculations, e.g., analog measurement circuitry coupled to microcontroller or processor that is configured to perform calculation and communication tasks. Furthermore, it will be understood that tasks of power monitoring controller circuitry 220 may alternatively be performed in other embodiments by circuitry provided separate from a main VR of an information handling system, e.g., as a completely separate circuit or as a circuit combined with DC/DC voltage regulation circuitry 192 that is described further herein. As further shown in FIG. 2, DC/DC voltage regulation circuitry 192 may be coupled to a communication bus 208 which may be, for example, system management bus (SMBus), power management bus (PMBus), inter-integrated circuitry (I²C) bus, etc.

Figure 3:
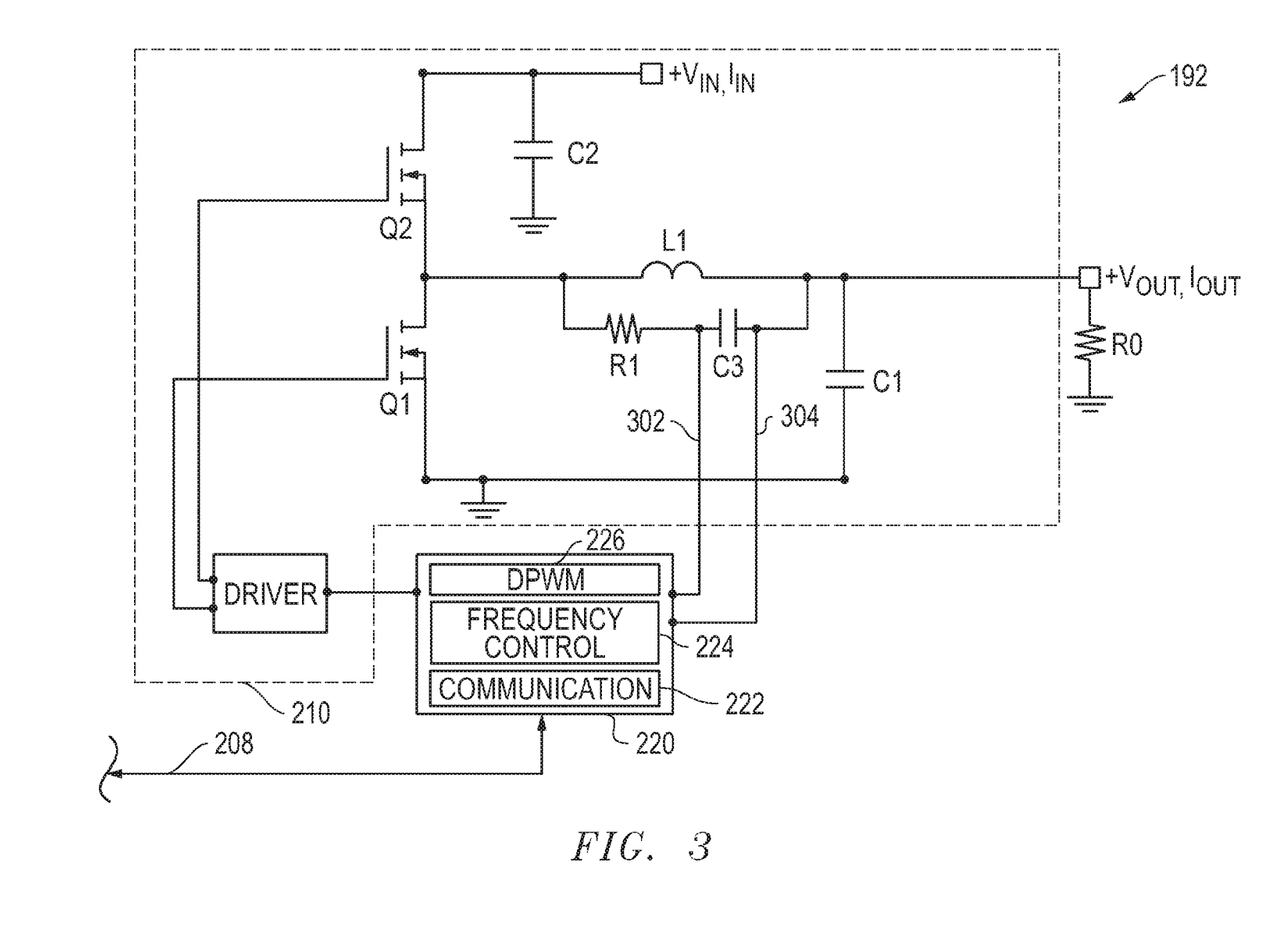
FIG. 3 is a simplified block diagram of DC/DC voltage regulation circuitry configured according to one exemplary embodiment of the disclosed systems and methods.

FIG. 3 further illustrates one exemplary embodiment of DC/DC voltage regulation circuitry 192. As shown, DC/DC voltage regulation circuitry 192 of this embodiment includes monitoring control circuitry 220 that itself includes a communication interface 222 (e.g., I2C/monitor/control circuitry interface), frequency control component 224, and duty cycle pulse wave modulation (DPWM) component 226 that may be implemented by one or more programmed processing devices such as processor/s, microcontroller/s, FPGA/s, ASICs, etc. Communication interface 222 may be present to communicatively couple the components of control circuitry to communication bus 208 previously described. In one exemplary embodiment, control circuitry 220 may be programmed to implemented frequency controller component 224 to dynamically vary the switching frequency, and control circuitry 220 may be programmed to implemented DWPM component 226 to adjust the duty cycle width. As further shown, in this embodiment monitoring control circuitry 220 is coupled to control driver circuitry 210 that may include, for example, switching circuitry for controlling transistors (e.g., MOSFETs) Q2 and Q1 in order to produce $V_{OUT}$ from DC/DC voltage regulation circuitry 192 as shown through inductor L1 to respective system load $R_O$, which may represent one or more components of the previously described system load of FIG. 1. Capacitor C1 may also be coupled as shown between $V_{OUT}$ and ground.

Still referring to FIG. 3, components of a direct current resistance (DCR) sensing circuit may be provided in one exemplary embodiment to sense current through inductor L1. As shown, these DCR components may include R1 and C3 that are coupled in parallel with inductor L1. Controller 220 may be coupled to monitor current through inductor L1 using sensing paths 302 and 304 that may be employed by controller 220 to monitor the voltage across C3 (which is proportional to the current through L1) to calculate $I_{OUT}$. However, it will be understood that any other suitable current sensing circuitry and/or methodology may be employed in other embodiments.

Figure 4:
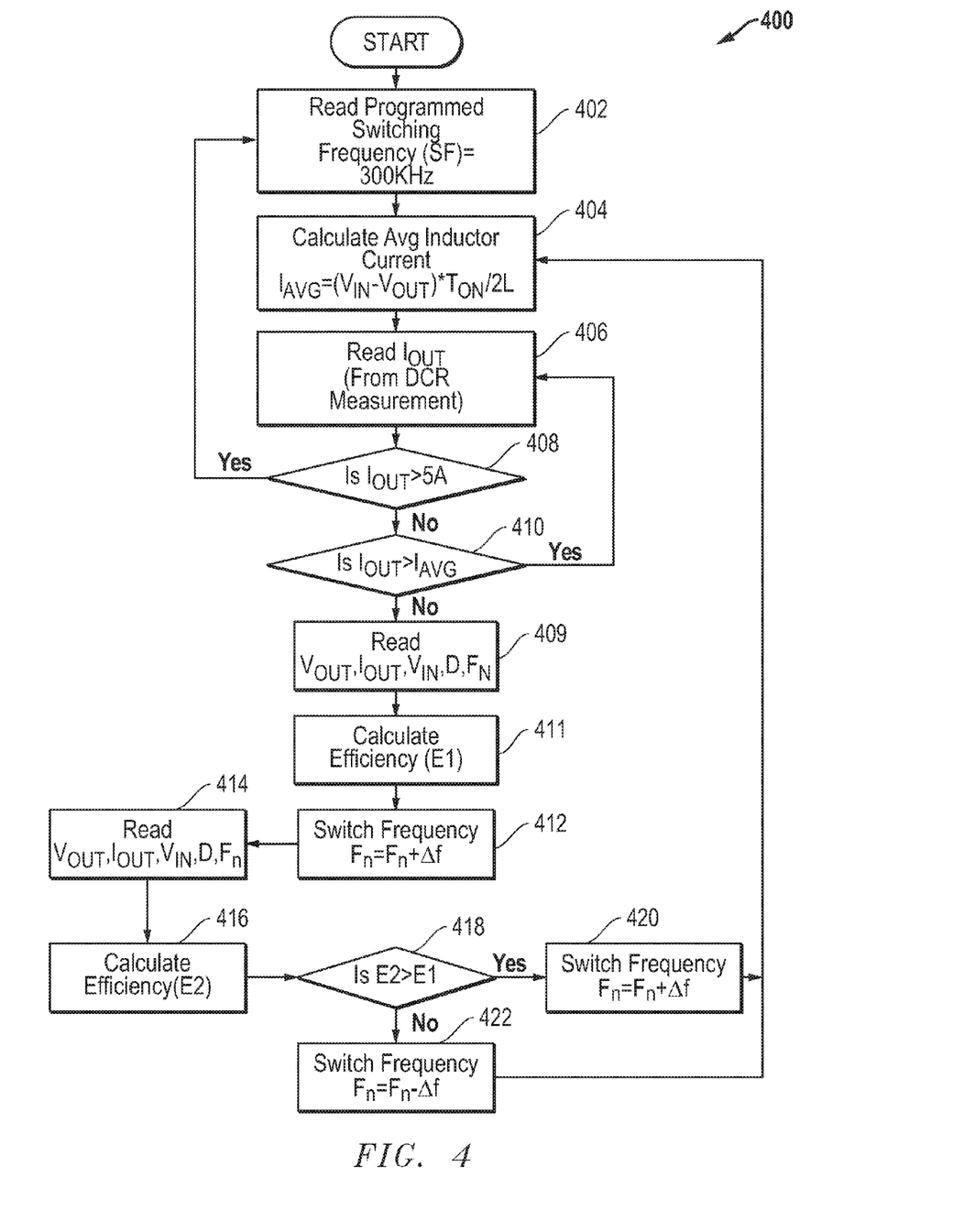
FIG. 4 illustrates methodology according to one exemplary embodiment of the disclosed systems and methods.

FIG. 4 illustrates methodology 400 that may be implemented, e.g., by programming within frequency control component 224 of control circuitry 220, to perform runtime efficiency characterization for closed loop frequency control. In this regard, methodology 400 may be implemented to dynamically find the optimal switching frequency for DC/DC voltage regulation circuitry 192 based on VR efficiency of DC/DC voltage regulation circuitry 192, and in one exemplary embodiment to adjust the switching frequency to maintain operation of DC/DC voltage regulation circuitry 192 in continuous conduction mode (CCM). As shown in FIG. 4, methodology 400 may start by reading a programmed initial switching frequency (SF) value, e.g., from default values stored in memory (e.g., NVRAM, optical or magnetic disk, etc.) coupled to or integrated with control circuitry 220. As an example only, such an initial SF may be a value such as 300 KHz. At the time of step 402, the controller 220 controls switch Q2 of DC/DC voltage regulation circuitry 192 to implement the initial switching frequency of step 402 and then proceeds to step 404.

Next, in step 404, the average peak to peak ripple current ($I_{p-p}$ or $I_{AVG}$) for inductor L1 of DC/DC voltage regulation circuitry 192 may be calculated in real time and stored, for example, in a designated register or other memory available to control circuit 220. In one exemplary embodiment, average $I_{p-p}$ may be calculated from measured values of preset $V_{IN}$ and regulated $V_{OUT}$, and on transistor on-time for Q2 from the current SF value using the following equation:

$$I_{AVG} = (V_{IN} - V_{OUT}) * T_{ON}/2L;$$

where: $V_{IN}$ is a known voltage value expressed in volts,
$V_{OUT}$ is a real time value measured in volts,
$T_{ON}$=current transistor on-time, based on real time measurement expressed in seconds, and
L=known inductance value of L1 expressed in Henry.

Next, in step 406, $I_{OUT}$ across inductor L1 is determined in real time, e.g. using DCR sensing technique by continuously monitoring voltage across capacitor C3 to obtain the value of the average inductor current $I_{OUT}$ flowing through the circuit to the output of DC/DC voltage regulation circuitry 192. In step 408, this measured $I_{OUT}$ value of step 406 may be optionally compared with a threshold default minimum $I_{OUT}$ value that may be, for example, a user selectable value that may be selected to correspond to a minimum current value at which diode emulation mode traditionally starts engaging (e.g., 5 amps or any other selected current value suitable for a given application). If the measured $I_{OUT}$ value of step 406 is found to be greater than the threshold default minimum $I_{OUT}$, then methodology 400 returns to step 402 which repeats with the same programmed switching frequency as originally employed. However, if the measured $I_{OUT}$ value of step 406 is found to be less than or equal to the threshold default minimum $I_{OUT}$, then methodology 400 proceeds as shown to step 410.

In step 410, the measured $I_{OUT}$ value of step 406 is compared with the value of average peak to peak ripple current ($I_{AVG}$) that was previously calculated and stored in step 404. If the measured $I_{OUT}$ value of step 406 is found to be greater than the calculated $I_{AVG}$, then this indicates continuous conduction mode (CCM) operation and methodology 400 returns to step 406 which repeats by again determining $I_{OUT}$ across inductor L1 in real time (without implementing steps 412-424). However, if the measured $I_{OUT}$ value of step 406 is found to be less than or equal to the calculated $I_{AVG}$, then CCM operation does not exist and methodology 400 proceeds as shown to step 409 where the following values are read by controller 220 (e.g., either by direct measurement or by reading stored values): $V_{IN}$, $I_{OUT}$, $V_{OUT}$, current Duty Cycle (D) of the current switching frequency, and optionally the current switching frequency ($F_n$).

Next, in step 411, current real time operating efficiency of DC/DC voltage regulation circuitry 192 may be determined in any manner suitable for characterizing efficiency of voltage regulation operations occurring therein, e.g., efficiency based on the amount of power expended to regulate an input voltage $V_{IN}$ to an output voltage $V_{OUT}$. In one exemplary embodiment, the operating efficiency (E1) of DC/DC voltage regulation circuitry 192 may be calculated in step 411 as follows (see FIGS. 2 and 3 for $I_{IN}$, $V_{IN}$ and $I_{OUT}$, $I_{OUT}$ of DC/DC voltage regulation circuitry 192).

$$I_{IN} = I_{OUT} * D;$$

$$\text{Output Power}(P_{OUT}) = V_{OUT} * I_{OUT};$$

$$\text{Input Power}(P_{IN}) = V_{IN} * I_{IN}; \text{ and}$$

$$\text{Efficiency} = P_{OUT}/P_{IN}.$$

It will further be understood that any parameter that is representative of (or based upon) a calculated operating efficiency of DC/DC voltage regulation circuitry 192 may be employed in the place of a calculated operating efficiency value in the methodology disclosed elsewhere herein. In any case, data of calculated efficiency (E1) of step 411 versus the current switching frequency ($F_n$) may be optionally stored in a look-up table or other data correlation structure, e.g., for use in assigning an initial efficiency value to a given programmed switching frequency (SF) if desired or needed.

Next, in step 412, the switching frequency ($F_n$) is increased by default by a designated incremental amount ($\Delta f$). The value of $\Delta f$ may be selected, such that it is sufficiently measurable to produce trend on change in efficiency, for example 10 KHz or other suitable value. Further, a value of the maximum allowable frequency for the main VR of the DC/DC voltage regulation circuitry 192 may be programmed at this time into the chip, e.g., power monitoring controller circuitry 220.

After incremental increase in switching frequency in step 412, the following real time values for DC/DC voltage regulation circuitry 192 are again read by controller 220 in step 414 (e.g., either by direct measurement or by reading stored values): $V_{IN}$, $I_{OUT}$, $V_{OUT}$, current Duty Cycle (D) of the current switching frequency, and optionally the current switching frequency ($F_n$). In step 416, these and/or other suitable values may be employed to calculate a new current real time operating efficiency (E2) of DC/DC voltage regulation circuitry 192, e.g., in a manner similar to that employed for step 411.

Next, in step 418, the new operating efficiency (E2) is compared to the initial operating efficiency (E1) to determine if new operating efficiency (E2) is improved (greater than) the initial operating efficiency (E1). If so, then in step 420 controller 220 continues to operate DC/DC voltage regulation circuitry 192 with the new increased switch frequency ($F_n + \Delta f$), and methodology 400 returns to step 404 and repeats. However, if in step 418, the new operating efficiency (E2) is found not to be greater than the initial operating efficiency (E1), then in step 422 controller 220 decreases the switching frequency of DC/DC voltage regulation circuitry 192 to a new decreased switch frequency ($F_n - \Delta f$), and methodology 400 returns to step 404 and repeats. In this regard, the incremental decrease ($-\Delta f$) in switching frequency may be selected in a similar manner as described for the incremental increase ($+\Delta f$) of step 412. It will be understood that the methodology of FIG. 4 is exemplary only, and that any combination of fewer, alternative, or additional steps may be employed that is suitable for dynamically managing voltage regulator switching frequency in a manner as described herein.

In one exemplary embodiment, the disclosed systems and methods may be implemented using a methodology or algorithm (e.g., such as illustrated in FIG. 4) that may be implemented on any processing device hardware (e.g., controller, microcontroller, CPU, FPGA, ASIC, etc.), and in a manner that self learns and optimizes itself to achieve best performance. An example of this self-learning capability is a prediction of future load based on a previously observed pattern that is used to drive adjustment of switching frequency ahead of time.

In another exemplary embodiment, an optional lookup table may be maintained, e.g., in memory coupled to or integrated with controller 220. Such a lookup table may be populated with previously determined values of switching frequency that correspond to particular measured values, or value ranges, of load current ($I_{OUT}$) in order to save processing time in those cases where given values of switching frequency have already been determined and optimized for corresponding values of $I_{OUT}$. In such a case, a faster decision may be made by controller 220 because real time $I_{OUT}$ only need to be measured in order to select an optimized switching frequency value from the lookup table.

For example, referring to the exemplary methodology 400 of FIG. 4, each time a new switching frequency is selected in step 420 or 422 for a given measured $I_{OUT}$ determined in the preceding step 406, it may be stored in a look-up table to correlate with the corresponding value, or a value range, corresponding to the value of $I_{OUT}$ measured in the preceding step 406. Table 1 below illustrates an example of one form of such a lookup table that includes multiple different values of switching frequency $F_{n1}$, $F_{n2}$, and $F_{n3}$. When so implemented, an optional step may be inserted, e.g., between steps 406 and 408, where the lookup table is read to determine if there is a stored previously-determined value of switching frequency that corresponds to the most recently determined value of $I_{OUT}$ just measured in the preceding step 406. If so, then that predetermined switching frequency may be immediately selected without the need for performing steps 408-424, in which case methodology may return to step 406 and repeat. However, if there is no stored previously-determined value of switching frequency that corresponds to the most recently determined value of $I_{OUT}$ just measured in the preceding step 406, then methodology 400 may proceed as previously described to step 408.

TABLE 1

| Measured $I_{OUT}$ | Optimized Switching Frequency Corresponding to Measured $I_{out}$ |
|---|---|
| 0 < $I_{OUT}$ < 1 A | $F_n = F_{n1}$ |
| 1 < $I_{OUT}$ < 3 A | $F_n = F_{n2}$ |
| 3 < $I_{OUT}$ < 5 A | $F_n = F_{n3}$ |

Figure 5:
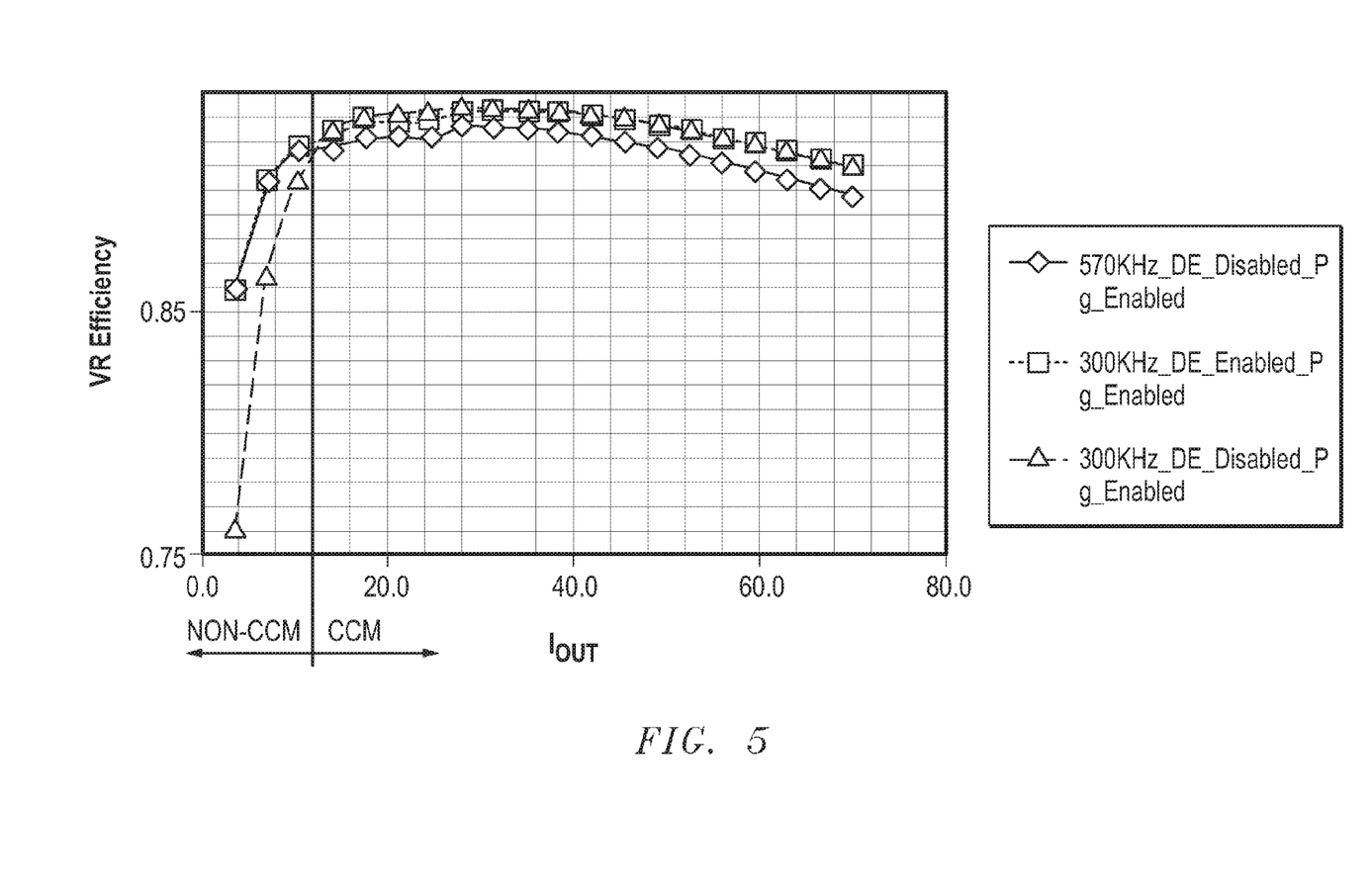
FIG. 5 illustrates a plot of VR efficiency versus $I_{OUT}$ obtained during efficiency testing of DC/DC voltage regulation circuitry configured according to one exemplary embodiment of the disclosed systems and methods.

FIG. 5 illustrates a plot of VR efficiency versus $I_{OUT}$ obtained during efficiency testing of DC/DC voltage regulation circuitry of the multi-phase buck converter type (i.e., a memory voltage regulator) at different frequencies. The test data of FIG. 5 is broken down as follows.

1) Data curve with triangle-shaped points is VR efficiency data obtained at 300 KHz switching frequency without diode emulation or phase shedding, using conventional methodology without using the dynamic VR switching frequency management methodology of the present disclosure.
2) Data curve with square-shaped points is VR efficiency data obtained at 300 KHz switching frequency using conventional diode emulation and phase shedding, without using the dynamic VR switching frequency management methodology of the present disclosure.
3) Data curve with diamond-shaped points is VR efficiency data obtained using phase shedding and using the dynamic VR switching frequency management methodology 400 of FIG. 4 to set a 570 KHz switching frequency, but without diode emulation.

VR efficiency testing during single phase operation and under a light current load (using phase shedding at <20 Amps) condition has shown that VR efficiency may be increased by increasing the switching frequency using the disclosed dynamic VR switching frequency management of the present disclosure. As may be seen in FIG. 5, when the switching frequency is increased to 570 KHz in the light load region ($I_{OUT}$ less than or equal to average peak to peak ripple current, $I_{AVG}$) using the disclosed systems and methods but without diode emulation, the resulting VR efficiency curve overlays and is equal to the VR efficiency curve obtained using diode emulation when in the light load region. This illustrates that the disclosed systems and methods for dynamic VR switching frequency management may be used to obtain substantially the same VR efficiency improvement in the light load region as may be achieved using conventional diode emulation, but without the complication of a diode emulation circuit. In this regard, a further increase in switching frequency should improve the VR efficiency further in the light load region. Although not wishing to bound by theory, it is believed that this occurs due to a reduction in inductor core power loss with increased switching frequency that is greater (or that more than offsets) any increase in power loss that occurs at the increased switching frequency due to switching and conducting losses of the switching FETs, thus resulting in an overall efficiency improvement of the VR at increased switching frequencies.

Figure 6:
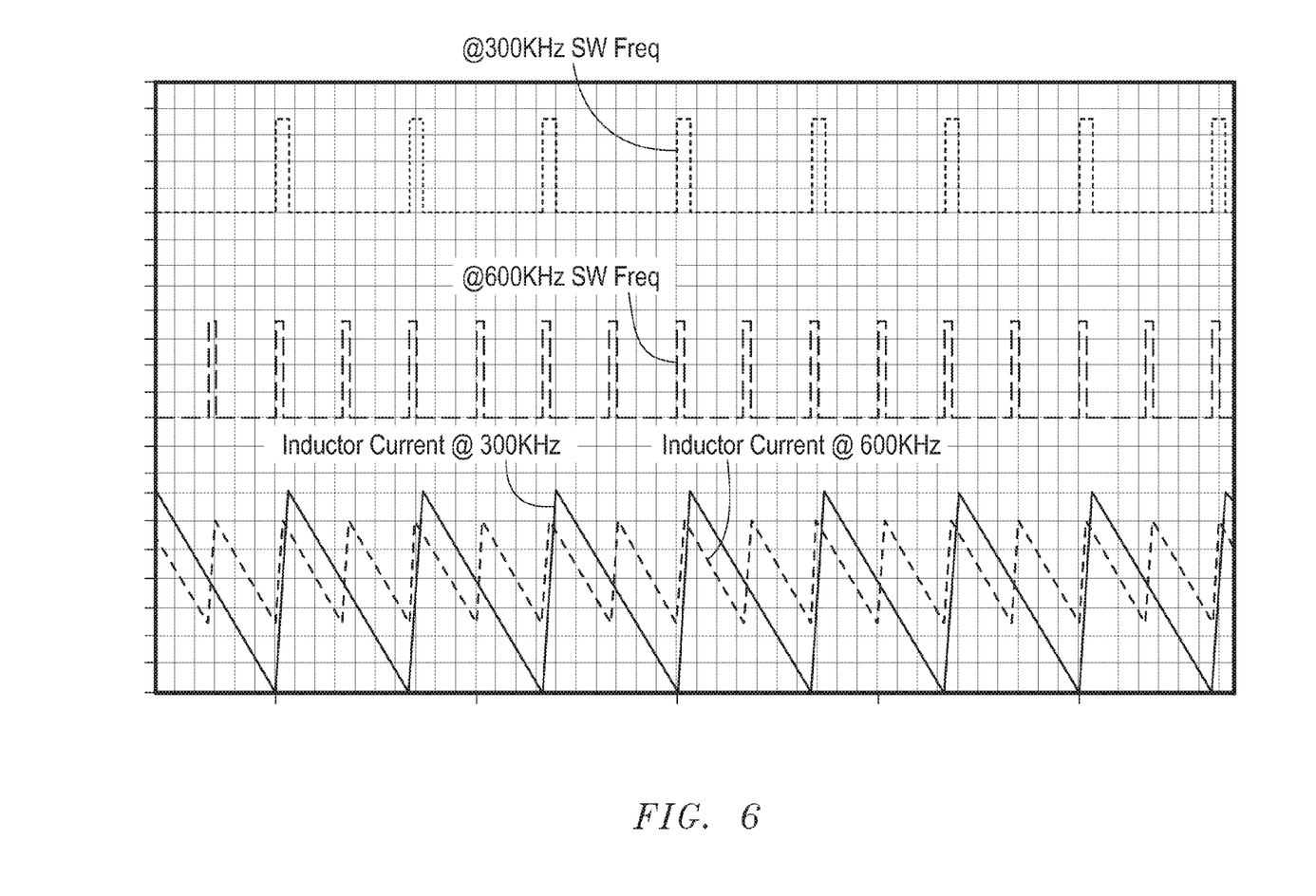
FIG. 6 illustrates VR inductor current as a function of time for two VR switching frequencies of 300 KHz and 600 KHz.

FIG. 6 illustrates VR inductor current as a function of time for two VR switching frequencies of 300 KHz and 600 KHz. Also shown is FET switching voltage versus time for each of VR switching frequencies of 300 KHz and 600 KHz. Figure shows how I peak-to-peak narrows at higher frequencies, and with no negative current. With higher frequency that eliminates negative current, the overall efficiency increases while avoiding complexity of diode emulation mode.

It will be understood that one or more of the tasks, functions, or methodologies described herein (e.g., including those performed by controller 220) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium residing on or accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
 a system load; and
 DC/DC voltage regulation circuitry comprising:
  a power processing circuit including a current path coupled to supply current of regulated output DC voltage across to power said system load, said power processing circuit comprising one or more drive transistors and the current path of the power processing circuit comprising at least one inductor for providing current to the system load of the information handling system,
  power monitoring controller circuitry coupled to the power processing circuitry, the power monitoring controller circuitry comprising at least one processing device programmed to regulate power supplied by said DC/DC voltage regulation circuitry across the current path to said system load of said information handling system by switching the one or more drive transistors alternately between ON and OFF states at two or more different switching frequencies;
  where the at least one processing device of the power monitoring controller circuitry is further programmed to:
   determine a real time current load ($I_{OUT}$) supplied by said DC/DC voltage regulation circuitry across the current path to the system load of the information handling system at a first one of the two or more different switching frequencies, and
   incrementally increase the switching frequency of said one or more drive transistors of said power processing circuit to a second one of the two or more different switching frequencies if and only if said determined real time current load ($I_{OUT}$) is less than or equal to at least one of a selected threshold default minimum $I_{OUT}$ value, a value of average peak to peak ripple current ($I_{AVG}$) for the at least one inductor at the first one of the two or more different switching frequencies, or a combination thereof.

2. The system of claim 1, where the at least one processing device of the power monitoring controller circuitry is further programmed to:
first determine a first real time current load ($I_{OUT}$) supplied across the current path to the system load of the information handling system at a first one of the two or more different switching frequencies;
then compare the value of the determined first real time current load ($I_{OUT}$) to a selected threshold default minimum $I_{OUT}$ value; and
then incrementally increase the switching frequency of said one or more drive transistors of said power processing circuit to a second one of the two or more different switching frequencies if and only if said determined real time current load ($I_{OUT}$) is less than or equal to the selected threshold default minimum $I_{OUT}$ value.

3. The system of claim 1, where the at least one processing device of the power monitoring controller circuitry is further programmed to:
first determine a real time current load ($I_{OUT}$) supplied by said DC/DC voltage regulation circuitry across the current path to the system load of the information handling system at a first one of the two or more different switching frequencies;
then compare the value of the determined first real time current load ($I_{OUT}$) to a selected threshold default minimum $I_{OUT}$ value; and
then incrementally increase the switching frequency of said one or more drive transistors of said power processing circuit only if said determined real time current load ($I_{OUT}$) is less than or equal to the selected threshold default minimum $I_{OUT}$ value.

4. The system of claim 1, where the at least one processing device of the power monitoring controller circuitry is further programmed to:
determine a real time current load ($I_{OUT}$) supplied across the current path to the system load of the information handling system at a first one of the two or more different switching frequencies;
determine a first value of average peak to peak ripple current ($I_{AVG}$) for the at least one inductor at the first one of the two or more different switching frequencies;
compare the value of the determined first real time current load ($I_{OUT}$) to the determined first value of average peak to peak ripple current ($I_{AVG}$) for the at least one inductor at the first one of the two or more different switching frequencies; and
then incrementally increase the switching frequency of said one or more drive transistors of said power processing circuit to a second one of the two or more different switching frequencies only if said determined real time current load ($I_{OUT}$) is less than or equal to the determined first value of average peak to peak ripple current ($I_{AVG}$) for the at least one inductor at the first one of the two or more different switching frequencies.

5. The system of claim 1, where the at least one processing device of the power monitoring controller circuitry is further programmed to:
a) incrementally increase the switching frequency of said one or more drive transistors of said power processing circuit to a new increased value of switching frequency if and only if the real time current load ($I_{OUT}$) is less than a value of average peak to peak ripple current ($I_{AVG}$) for the at least one inductor at the first one of the two or more different switching frequencies;

b) determine a first real time operating efficiency value of said power processing circuit corresponding to the first one of the two or more different switching frequencies;
c) determine a new real time operating efficiency value of said power processing circuit corresponding to the new increased value of switching frequency; and
d) then either:
continue to regulate power supplied by said DC/DC voltage regulation circuitry across the current path to said system load of said information handling system at the new increased value of switching frequency if the corresponding new real time operating efficiency value is greater than the first real time operating efficiency value, or
incrementally decrease the switching frequency of said one or more drive transistors of said power processing circuit to a new decreased switching frequency if the new real time operating efficiency value is not greater than the first real time operating efficiency value, the new decreased switching frequency being incrementally decreased relative to the first switching frequency.

6. The system of claim 5, where the at least one processing device of the power monitoring controller circuitry is further programmed to:
e) determine a new real time current load ($I_{OUT}$) supplied across the current path to the system load of the information handling system at the new increased or decreased switching frequency of step d);
f) determine a new value of average peak to peak ripple current ($I_{AVG}$) for the at least one inductor at the new increased or decreased switching frequency of step d);
g) then compare the determined value of the new real time current load ($I_{OUT}$) of step e) to the determined new value of average peak to peak ripple current ($I_{AVG}$) of step f);
h) then incrementally increase the switching frequency of said one or more drive transistors of said power processing circuit to a subsequent new one of the two or more different switching frequencies if and only if said determined value of new real time current load ($I_{OUT}$) of step d) is less than or equal to the determined new value of average peak to peak ripple current ($I_{AVG}$) of step e) for the at least one inductor at the first one of the two or more different switching frequencies;
i) determine a real time operating efficiency value of said power processing circuit corresponding to the new increased or decreased switching frequency of step d);
j) determine a subsequent new real time operating efficiency value of said power processing circuit corresponding to the subsequent new increased value of switching frequency of step h);
k) then either:
continue to regulate power supplied by said DC/DC voltage regulation circuitry across the current path to said system load of said information handling system at the subsequent new increased value of switching frequency of step h) if the corresponding subsequent new real time operating efficiency value of step j) is greater than the real time operating efficiency value of step i), or
incrementally decrease the switching frequency of said one or more drive transistors of said power processing circuit to a subsequent new decreased switching frequency if the corresponding subsequent new real time operating efficiency value of step j) is not greater than the real time operating efficiency value of step i), the subsequent new decreased switching frequency being incrementally decreased relative to the new increased or decreased switching frequency of step d); and l) then iteratively repeat said steps e) through k) for the duration of time that said DC/DC voltage regulation circuitry is supplying power to said system load of said information handling system; wherein said new increased or decreased switching frequency of step d) of each subsequent iteration is substituted with the new increased or decreased switching frequency of the most recent previous step k) of the immediately previous iteration.

7. The system of claim 6, further comprising memory coupled to the at least one processing device of the power monitoring controller circuitry; and where the at least one processing device of the power monitoring controller circuitry is further programmed to store in the memory each determined real time operating efficiency value of said power processing circuit with its corresponding switching frequency in a data correlation; and then subsequently access the data correlation in step i) to retrieve from the memory a stored operating efficiency value of said power processing circuit corresponding to a subsequent new increased or decreased switching frequency.

8. The system of claim 1, where the at least one processing device of the power monitoring controller circuitry is further programmed to:
incrementally increase the switching frequency of said one or more drive transistors of said power processing circuit to a second one of the two or more different switching frequencies after determining that the real time current load ($I_{OUT}$) is less than or equal to at least one of a selected threshold default minimum $I_{OUT}$ value, a value of average peak to peak ripple current ($I_{AVG}$) for the at least one inductor at the first one of the two or more different switching frequencies, or a combination thereof;
determine a first real time operating efficiency value of said power processing circuit corresponding to the first one of the two or more different switching frequencies;
determine a second real time operating efficiency value of said power processing circuit corresponding to the second one of the two or more different switching frequencies; and
then either:
continue to regulate power supplied by said DC/DC voltage regulation circuitry across the current path to said system load of said information handling system at the first one of the two or more different switching frequencies if the second real time operating efficiency value is greater than the first real time operating efficiency value, or
incrementally decrease the switching frequency of said one or more drive transistors of said power processing circuit to a third one of the two or more different switching frequencies if the second real time operating efficiency value is not greater than the first real time operating efficiency value, the third switching frequency being incrementally decreased relative to the first switching frequency.

9. An information handling system, comprising:
a system load; and
DC/DC voltage regulation circuitry comprising:
a power processing circuit including a current path coupled to supply current of regulated output DC voltage to power said system load, said power processing circuit comprising one or more drive transistors for providing current ($I_{OUT}$) across the current path to the system load of the information handling system;
power monitoring controller circuitry coupled to the power processing circuitry, the power monitoring controller circuitry comprising at least one processing device programmed to regulate power supplied by said DC/DC voltage regulation circuitry across the current path to said system load of said information handling system by switching the one or more drive transistors alternately between ON and OFF states at two or more different switching frequencies, and to incrementally increase the switching frequency of said one or more drive transistors of said power processing circuit as the current ($I_{OUT}$) decreases;
where the at least one processing device of the power monitoring controller circuitry is further programmed to:
a) determine a real time operating efficiency value of said power processing circuit corresponding to each of the two or more different switching frequencies, each of the real time operating efficiency values being determined while said one or more drive transistors are switched alternately between ON and OFF states at each of the two or more different switching frequencies,
b) vary the value of said switching frequency of said one or more drive transistors of said power processing circuit based on a comparison of said determined two or more real time operating efficiency values of said power processing circuit, and
c) iteratively repeat said steps a) through b) for the duration of time that said DC/DC voltage regulation circuitry is supplying power to said system load of said information handling system.

10. The system of claim 9, further comprising memory coupled to the at least one processing device of the power monitoring controller circuitry; and where the at least one processing device of the power monitoring controller circuitry is further programmed to store in the memory each determined real time operating efficiency value of said power processing circuit with its corresponding switching frequency in a data correlation; then subsequently access the data correlation to retrieve from the memory a stored operating efficiency value of said power processing circuit corresponding to a subsequent new increased or decreased switching frequency; and then vary the value of said switching frequency of said one or more drive transistors of said power processing circuit based on a comparison of said retrieved value of operating efficiency value of said power processing circuit corresponding to a another retrieved or determined value of operating efficiency value of said power processing circuit.

11. A method for regulating voltage in an information handling system, comprising:
providing DC/DC voltage regulation circuitry coupled by a current path to supply power to a system load of said information handling system, said DC/DC voltage regulation circuitry including a power processing circuit comprising one or more drive transistors, the current path of the power processing circuit comprising at least one inductor for providing current to the system load of the information handling system;
regulating power supplied by said DC/DC voltage regulation circuitry across the current path to said system load of said information handling system by switching the one or more drive transistors alternately between ON and OFF states at two or more different switching frequencies;

determining a real time current load ($I_{OUT}$) supplied by said DC/DC voltage regulation circuitry across the current path to the system load of the information handling system at a first one of the two or more different switching frequencies; and incrementally increasing the switching frequency of said one or more drive transistors of said power processing circuit to a second one of the two or more different switching frequencies if and only if said determined real time current load ($I_{OUT}$) is less than or equal to at least one of a selected threshold default minimum $I_{OUT}$ value, a value of average peak to peak ripple current ($I_{AVG}$) for the at least one inductor at the first one of the two or more different switching frequencies, or a combination thereof.

12. The method of claim 11, further comprising:

first determining a first real time current load ($I_{OUT}$) supplied across the current path to the system load of the information handling system at a first one of the two or more different switching frequencies;

then comparing the value of the determined first real time current load ($I_{OUT}$) to a selected threshold default minimum $I_{OUT}$ value; and then incrementally increasing the switching frequency of said one or more drive transistors of said power processing circuit to a second one of the two or more different switching frequencies if and only if said determined real time current load ($I_{OUT}$) is less than or equal to the selected threshold default minimum $I_{OUT}$ value.

13. The method of claim 11, further comprising;

first determining a real time current load ($I_{OUT}$) supplied by said DC/DC voltage regulation circuitry across the current path to the system load of the information handling system at a first one of the two or more different switching frequencies;

then comparing the value of the determined first real time current load ($I_{OUT}$) to a selected threshold default minimum $I_{OUT}$ value; and then incrementally increasing the switching frequency of said one or more drive transistors of said power processing circuit only if said determined real time current load ($I_{OUT}$) is less than or equal to the selected threshold default minimum $I_{OUT}$ value.

14. The method of claim 11, where the method further comprises:

determining a real time current load ($I_{OUT}$) supplied across the current path to the system load of the information handling system at a first one of the two or more different switching frequencies;

determining a first value of average peak to peak ripple current ($I_{AVG}$) for the at least one inductor at the first one of the two or more different switching frequencies;

comparing the value of the determined first real time current load ($I_{OUT}$) to the determined first value of average peak to peak ripple current ($I_{AVG}$) for the at least one inductor at the first one of the two or more different switching frequencies; and then incrementally increasing the switching frequency of said one or more drive transistors of said power processing circuit to a second one of the two or more different switching frequencies only if said determined real time current load ($I_{OUT}$) is less than or equal to or equal to the determined first value of average peak to peak ripple current ($I_{AVG}$) for the at least one inductor at the first one of the two or more different switching frequencies.

15. The method of claim 11, further comprising:

a) incrementally increasing the switching frequency of said one or more drive transistors of said power processing circuit to a new increased value of switching frequency if and only if the real time current load ($I_{OUT}$) is less than or equal to a value of average peak to peak ripple current ($I_{AVG}$) for the at least one inductor at the first one of the two or more different switching frequencies;

b) determining a first real time operating efficiency value of said power processing circuit corresponding to the first one of the two or more different switching frequencies;

c) determining a new real time operating efficiency value of said power processing circuit corresponding to the new increased value of switching frequency; and d) then either:

continuing to regulate power supplied by said DC/DC voltage regulation circuitry across the current path to said system load of said information handling system at the new increased value of switching frequency if the corresponding new real time operating efficiency value is greater than the first real time operating efficiency value, or incrementally decreasing the switching frequency of said one or more drive transistors of said power processing circuit to a new decreased switching frequency if the new real time operating efficiency value is not greater than the first real time operating efficiency value, the new decreased switching frequency being incrementally decreased relative to the first switching frequency.

16. The method of claim 15, further comprising:

e) determining a new real time current load ($I_{OUT}$) supplied across the current path to the system load of the information handling system at the new increased or decreased switching frequency of step d);

f) determining a new value of average peak to peak ripple current ($I_{AVG}$) for the at least one inductor at the new increased or decreased switching frequency of step d);

g) then comparing the determined value of the new real time current load ($I_{OUT}$) of step e) to the determined new value of average peak to peak ripple current ($I_{AVG}$) of step f);

h) then incrementally increasing the switching frequency of said one or more drive transistors of said power processing circuit to a subsequent new one of the two or more different switching frequencies if and only if said determined value of new real time current load ($I_{OUT}$) of step d) is less than or equal to or equal to the determined new value of average peak to peak ripple current ($I_{AVG}$) of step e) for the at least one inductor at the first one of the two or more different switching frequencies;

i) determining a real time operating efficiency value of said power processing circuit corresponding to the new increased or decreased switching frequency of step d);

j) determining a subsequent new real time operating efficiency value of said power processing circuit corresponding to the subsequent new increased value of switching frequency of step h);

k) then either:

continuing to regulate power supplied by said DC/DC voltage regulation circuitry across the current path to said system load of said information handling system at the subsequent new increased value of switching frequency of step h) if the corresponding subsequent new real time operating efficiency value of step j) is greater than the real time operating efficiency value of step i), or incrementally decreasing the switching frequency of said one or more drive transistors of said power processing circuit to a subsequent new decreased switching frequency if the corresponding subsequent new real time operating efficiency value of step j) is not greater than the real time operating efficiency value of step i), the subsequent new decreased switching frequency being incrementally decreased relative to the new increased or decreased switching frequency of step d); and l) then iteratively repeating said steps e) through k) for the duration of time that said DC/DC voltage regulation circuitry is supplying power to said system load of said information handling system; wherein said new increased or decreased switching frequency of step d) of each subsequent iteration is substituted with the new increased or decreased switching frequency of the most recent previous step k) of the immediately previous iteration.

17. The method of claim 16, further comprising storing each determined real time operating efficiency value of said power processing circuit with its corresponding switching frequency in a data correlation; and then subsequently accessing the data correlation in step i) to retrieve a stored operating efficiency value of said power processing circuit corresponding to a subsequent new increased or decreased switching frequency.

18. The method of claim 11, further comprising:
incrementally increasing the switching frequency of said one or more drive transistors of said power processing circuit to a second one of the two or more different switching frequencies after determining that the real time current load ($I_{OUT}$) is less than or equal to at least one of a selected threshold default minimum $I_{OUT}$ value, a value of average peak to peak ripple current ($I_{AVG}$) for the at least one inductor at the first one of the two or more different switching frequencies, or a combination thereof;
determining a first real time operating efficiency value of said power processing circuit corresponding to the first one of the two or more different switching frequencies;
determining a second real time operating efficiency value of said power processing circuit corresponding to the second one of the two or more different switching frequencies; and
then either:
continuing to regulate power supplied by said DC/DC voltage regulation circuitry across the current path to said system load of said information handling system at the first one of the two or more different switching frequencies if the second real time operating efficiency value is greater than the first real time operating efficiency value, or
incrementally decreasing the switching frequency of said one or more drive transistors of said power processing circuit to a third one of the two or more different switching frequencies if the second real time operating efficiency value is not greater than the first real time operating efficiency value, the third switching frequency being incrementally decreased relative to the first switching frequency.

19. A method for regulating voltage in an information handling system, comprising:
a) providing DC/DC voltage regulation circuitry coupled by a current path to supply power to a system load of said information handling system, said DC/DC voltage regulation circuitry including a power processing circuit comprising one or more drive transistors;
b) regulating power supplied by said DC/DC voltage regulation circuitry across the current path to said system load of said information handling system by switching the one or more drive transistors alternately between ON and OFF states to provide current ($I_{OUT}$) across the current path to the system load of the information handling system at two or more different switching frequencies, and to incrementally increase the switching frequency of said one or more drive transistors of said power processing circuit as the value of current ($I_{OUT}$) decreases;
c) determining a real time operating efficiency value of said power processing circuit corresponding to each of the two or more different switching frequencies, each of the real time operating efficiency values being determined while said one or more drive transistors are switched alternately between ON and OFF states at each of the two or more different switching frequencies;
d) varying the value of said switching frequency of said one or more drive transistors of said power processing circuit based on a comparison of said determined two or more real time operating efficiency values of said power processing circuit; and
e) iteratively repeating said steps c) through d) for the duration of time that said DC/DC voltage regulation circuitry is supplying power to said system load of said information handling system.

20. The method of claim 19, further comprising storing each determined real time operating efficiency value of said power processing circuit with its corresponding switching frequency in a data correlation; then subsequently accessing the data correlation to retrieve a stored operating efficiency value of said power processing circuit corresponding to a subsequent new increased or decreased switching frequency; and then varying the value of said switching frequency of said one or more drive transistors of said power processing circuit based on a comparison of said retrieved value of operating efficiency value of said power processing circuit corresponding to another retrieved or determined value of operating efficiency value of said power processing circuit.

21. The system of claim 1, where the at least one processing device of the power monitoring controller circuitry is further programmed to:
incrementally increase the switching frequency of said one or more drive transistors of said power processing circuit as the determined real time current load ($I_{OUT}$) decreases; and
incrementally decrease the switching frequency of said one or more drive transistors of said power processing circuit as the determined real time current load ($I_{OUT}$) increases.

22. The system of claim 1, where the at least one processing device of the power monitoring controller circuitry is further programmed to adjust the switching frequency of said one or more drive transistors of said power processing circuit to maintain operation of the DC/DC voltage regulation circuitry in continuous conduction mode (CCM).

23. The system of claim 9, where the at least one processing device of the power monitoring controller circuitry is further programmed to iteratively repeat said steps a) through b) for the duration of time that said DC/DC voltage regulation circuitry is supplying power to said system load of said information handling system to adjust the switching frequency of said one or more drive transistors of said power processing circuit to maintain operation of the DC/DC voltage regulation circuitry in continuous conduction mode (CCM).

24. The method of claim 11, further comprising:
incrementally increasing the switching frequency of said one or more drive transistors of said power processing circuit as the determined real time current load ($I_{OUT}$) decreases; and
incrementally decreasing the switching frequency of said one or more drive transistors of said power processing circuit as the determined real time current load ($I_{OUT}$) increases.

25. The method of claim 11, further comprising adjusting the switching frequency of said one or more drive transistors of said power processing circuit to maintain operation of the DC/DC voltage regulation circuitry in continuous conduction mode (CCM).

26. The method of claim 19, further comprising iteratively repeating said steps c) through d) for the duration of time that said DC/DC voltage regulation circuitry is supplying power to said system load of said information handling system to maintain operation of the DC/DC voltage regulation circuitry in continuous conduction mode (CCM).

* * * * *